(12) United States Patent
Kumar et al.

(10) Patent No.: US 12,443,555 B2
(45) Date of Patent: *Oct. 14, 2025

(54) FRAME ALIGNMENT RECOVERY FOR A HIGH-SPEED SIGNALING INTERCONNECT

(71) Applicant: NVIDIA Corporation, Santa Clara, CA (US)

(72) Inventors: Seema Kumar, Santa Clara, CA (US); Ish Chadha, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,758

(22) Filed: Dec. 13, 2023

(65) Prior Publication Data

US 2024/0111706 A1 Apr. 4, 2024

Related U.S. Application Data

(63) Continuation of application No. 17/556,892, filed on Dec. 20, 2021, now Pat. No. 11,899,609.

(51) Int. Cl.
*G06F 13/42* (2006.01)
*G06F 1/12* (2006.01)
(Continued)

(52) U.S. Cl.
CPC ............ *G06F 13/4208* (2013.01); *G06F 1/12* (2013.01)

(58) Field of Classification Search
CPC .............................. G06F 13/4208; G06F 1/12
(Continued)

(56) References Cited

U.S. PATENT DOCUMENTS

2006/0053328 A1 3/2006 Panikkar et al.
2008/0013609 A1* 1/2008 Daxer ..................... H04L 1/205
375/221

(Continued)

FOREIGN PATENT DOCUMENTS

EP 3340510 A1 6/2018

OTHER PUBLICATIONS

De Silva U.P., et al., "IEEE 802.3 100Gbps Ethernet PCS IP Design Challenges and Solutions," 2016 IEEE Symposium on Computer Applications Industrial Electronics, (ISCAIE), IEEE, May 30, 2016, pp. 21-25, KP032970658, p. 22, col. 2—p. 23, col. I *, [Retrieved on Sep. 22, 2016] DOI: 10.1109/ISCAIE.2016.7575030.

(Continued)

*Primary Examiner* — Chun Kuan Lee
(74) *Attorney, Agent, or Firm* — Lowenstein Sandler LLP

(57) ABSTRACT

A system includes a first device and a second device coupled to a link having one or more lanes. The first device is to transmit two or more frames to synchronize the one or more data lanes, where each frame comprises a quantity of bits. The second device is to receive a first set of bits from each data lane corresponding to the quantity of bits in each frame of the two or more frames. The second device is to determine that the first set of bits received from a data lane of the one or more data lanes does not correspond to a frame boundary of the two or more frames. The second device is further to synchronize each data lane of the one or more data lanes with respect to the frame boundary, responsive to determining that the first set of bits does not correspond to the frame boundary.

20 Claims, 7 Drawing Sheets

(51) Int. Cl.
    *H04J 3/06*     (2006.01)
    *H04L 7/00*     (2006.01)
    *H04L 7/033*     (2006.01)
    *H04L 7/10*     (2006.01)
    *H04L 25/14*     (2006.01)

(58) Field of Classification Search
    USPC .......................................................... 710/106
    See application file for complete search history.

(56) References Cited

U.S. PATENT DOCUMENTS

| | | |
|---|---|---|
| 2010/0103929 A1 | 4/2010 | Lee et al. |
| 2011/0239031 A1* | 9/2011 | Ware .................. G06F 13/1689 |
| | | 713/500 |
| 2013/0188676 A1 | 7/2013 | Shemesh |
| 2014/0365835 A1 | 12/2014 | Hu et al. |
| 2015/0281027 A1 | 10/2015 | Hutchison et al. |

OTHER PUBLICATIONS

Extended European Search Report for European Application No. 22212983.5, mailed May 25, 2023, 13 Pages.

\* cited by examiner

FRAME ALIGNMENT RECOVERY FOR A HIGH-SPEED SIGNALING INTERCONNECT

RELATED APPLICATIONS

This application is a continuation of U.S. patent application Ser. No. 17/556,892, filed Dec. 20, 2021, the entire contents of which are incorporated by reference.

TECHNICAL FIELD

At least one embodiment pertains to processing resources used to perform and facilitate high-speed communications. For example, at least one embodiment pertains to technology for frame alignment recovery in a ground-referenced signaling (GRS) interconnect.

BACKGROUND

Communication systems transmit signals from a transmitter to a receiver via a communication channel or medium (e.g., cables, printed circuit boards, links, wirelessly, etc.) To ensure data is reliably communicated when communicating chip-to-chip (C2C), the communication system can be trained before communicating data. For example, the communication system can be trained so that data received at the receiver is synchronized. Some communication systems can attempt to synchronize data received at the receiver by transmitting frame symbols and using a de-skewing first-in, first-out (FIFO) component for continuous frame alignment. Such conventional methods can reduce data transfer rates and decrease data bandwidth. Such conventional methods can also cause the synchronization process to be repeated each time data transmission is stopped and restarted.

BRIEF DESCRIPTION OF DRAWINGS

Various embodiments in accordance with the present disclosure will be described with reference to the drawings, in which.

DETAILED DESCRIPTION

Figure 1:
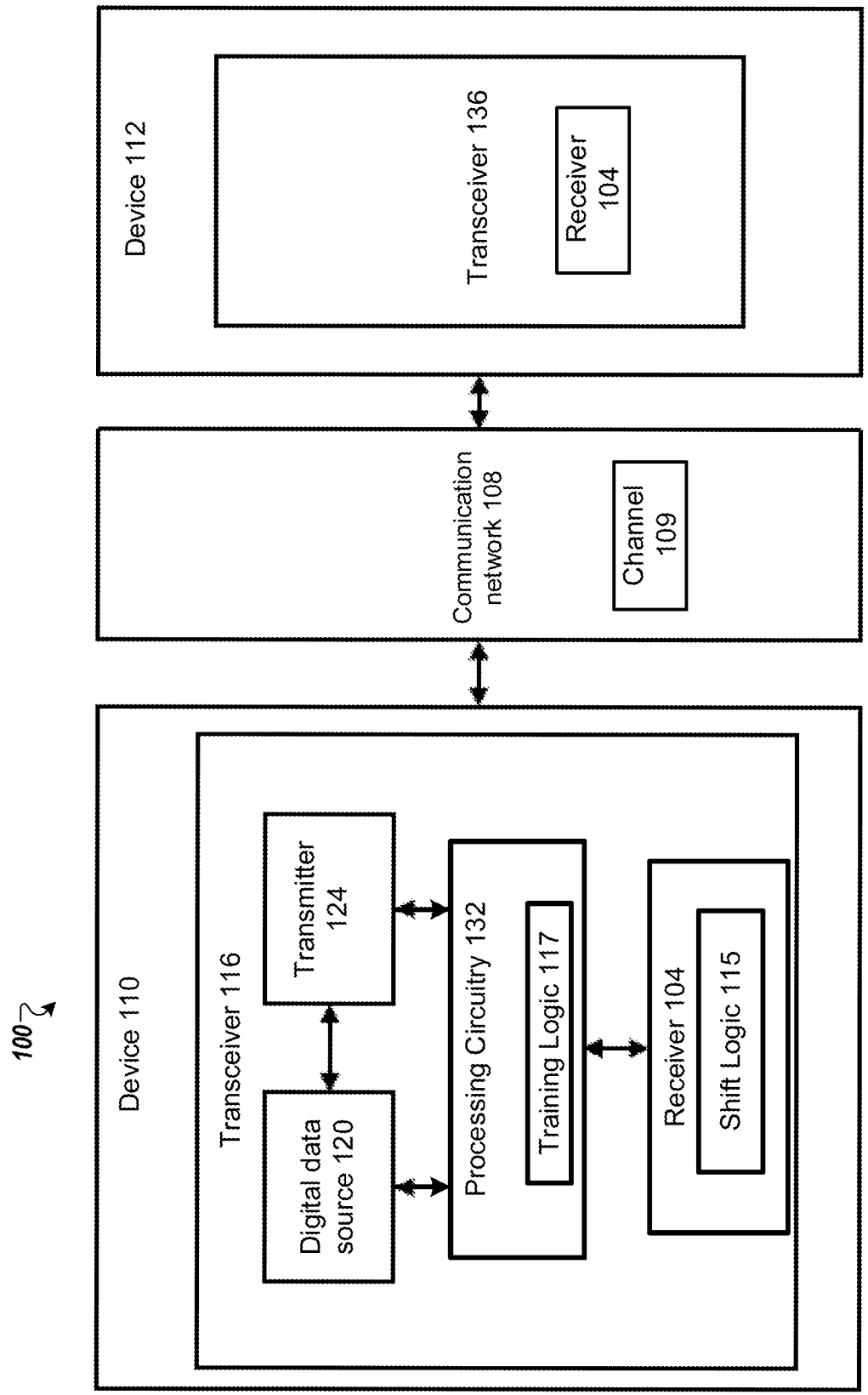
FIG. 1 is an example communication system employing a method for frame alignment recovery, in accordance with at least some embodiments.

Communication systems transmit signals from a transmitter to a receiver via a communication channel or medium (e.g., cables, printed circuit boards, links, wirelessly, etc.). In some communication systems, data sent from the transmitter can be skewed or misaligned when received at the receiver. This can cause data to be corrupted, and data transmission can be unreliable in the system. The communication system can be an example of a forwarded clock architecture. For example, the communication system can include a first device (e.g., a first integrated circuit (IC) or chip) and a second device (e.g., a second IC or chip) and communicate data via a ground-referenced signaling (GRS) link—e.g., the communication system may be a chip-to-chip (C2C) interconnect with both devices including a transmitter and a receiver. The first device can transmit data framed with respect to a first clock signal and also transmit a second clock signal associated with the link to the second device— e.g., the transmitter can frame the data according to the first clock signal while the link can transmit the data according to the second clock signal—e.g., data can be transmitted using frames of fixed length, each frame including a same number of bits. The second device can divide the second clock signal and attempt recover the original first clock signal (e.g., generate a recovered clock signal) to determine the frame boundaries of the data received. In some embodiments, the first device and second device can be asynchronous. In such embodiments, the clock phase alignment can be different for the first and second device. For example, in forwarded clock communication systems, a transmitter clock of the first device can be misaligned with respect to a recovered clock generated at the second device—e.g., because the first device and second device are asynchronous, the transmitter clock and the recovered clock at the receiver can be aligned arbitrarily.

Additionally, each data lane of the link can have different physical characteristics—e.g., each trace on a printed circuit board can be different from other traces due to deviations in a manufacturing process of the link Accordingly, data received at one data lane of the link can be misaligned or skewed with respect to other data lanes of the link—e.g., a first data lane can receive data before a second lane due to the manufacturing deviations. Some communication systems can transmit framing symbols and use de-skewing first-in, first-out (FIFO) components to indicate the start of data transmission or a message to align the data received. But transmitting framing symbols can take additional power, increase latency, and decrease data bandwidth. Further, in such communication systems, the frame alignment can occur after every data transmission is stopped causing increased latency each time data is transmitted. For example, the communication system can use the framing symbols each time new data is transmitted.

Advantageously, aspects of the present disclosure can address the deficiencies above and other challenges by providing a method for frame alignment by utilizing shifting logic in a receiver. The receiver can use the shifting logic to synchronize each data lane of the link with respect to the frame boundary. The receiver can also use the shifting logic to synchronize the frame boundary across all of the data lanes—e.g., ensure the data lanes are all synchronized with respect to the same frame boundary. For example, during initialization (e.g., before data is transmitted), the first device can transmit a stored non-aliasing repeated pattern to the second device—e.g., a component associated with the link in each device can be programmed with the non-aliasing repeated pattern so that either device can detect the repeating pattern. The receiver of the second device can determine if the pattern received at each lane is synchronized with respect to the frame boundary by comparing the incoming bits with the stored repeating pattern. If the receiver determines the incoming bits at a respective data lane do not correspond to the frame boundary, the receiver can shift the incoming bits by one or more unit intervals (UIs) until the incoming bits do correspond to the frame boundary—e.g., the second device can shift the incoming pattern by one (1) UI, determine if the shifted pattern corresponds to the frame boundary, and if not, continue shifting by one (1) UI until the incoming pattern corresponds to the frame boundary. The second device can do this for all of the data lanes until each data lane is synchronized with respect to the frame boundary.

After synchronizing with respect to the frame boundary, the first device can transmit a counting pattern (e.g., an ascending or descending count pattern) at each data lane. The second device can receive the count pattern at each data lane and determine the earliest count value received across the data lanes. Accordingly, the second device can determine which data lanes are not synchronized with respect to the other data lanes. The receiver can shift the incoming count pattern at data lanes receiving a count value different than the earliest count value by adding one or more burst lengths (BLs) until each data lane receives the same count value. For example, the first data lane can receive a count value of two (2) and the second data lane can receive a count value of four (4). If the receiver receives an ascending pattern, the count value of (2) can be considered the earliest value. In such embodiments, the second data lane is receiving the count value four (4) faster than the first data lane receiving two (2). Accordingly, the second device can shift the count pattern at the second data lane by two (2) burst lengths (e.g., delay the second lane by two (2) burst lengths) to match the count pattern received at the first data lane. If the receiver receives a descending pattern, the count value of four (4) can be considered the earliest value. In such embodiments, the second device can shift the count pattern at the first data lane by two (2) burst lengths (e.g., delay the second lane by two (2) burst lengths) to match the count pattern received at the second data lane. In either case, the second device can shift or add burst length shifts to the faster data lanes to synchronize across data lanes. As such, each data lane can be synchronized with respect to the same frame boundary. The communication system can also perform frame alignment for data transmitted from the second device to the first device as described herein.

By utilizing the repeating pattern and the count pattern, the communication system can align the frames received at the receiver. Additionally, the communication system can increase data bandwidth, decrease latency, and reduce power consumption by utilizing the repeating pattern and count pattern once compared with transmitting framing symbols for each data transmission. Accordingly, embodiments of the present application allow for a more reliable method for frame alignment recovery in a high-speed interconnect system.

FIG. 1 illustrates an example communication system 100 according to at least one example embodiment. The system 100 includes a device 110, a communication network 108 including a communication channel 109, and a device 112. In at least one embodiment, devices 110 and 112 are two end-point devices in a computing system, such as a central processing unit (CPU) or graphics processing unit (GPU). In at least one embodiment, devices 110 and 112 are two servers. In at least one example embodiment, devices 110 and 112 correspond to one or more of a Personal Computer (PC), a laptop, a tablet, a smartphone, a server, a collection of servers, or the like. In some embodiments, the devices 110 and 112 may correspond to any appropriate type of device that communicates with other devices connected to a common type of communication network 108. According to embodiments, the receiver 104 of devices 110 or 112 may correspond to a GPU, a switch (e.g., a high-speed network switch), a network adapter, a CPU, a memory device, an input/output (I/O) device, other peripheral devices or components on a system-on-chip (SoC), or other devices and components at which a signal is received or measured, etc. As another specific but non-limiting example, the devices 110 and 112 may correspond to servers offering information resources, services, and/or applications to user devices, client devices, or other hosts in the system 100.

Examples of the communication network 108 that may be used to connect the devices 110 and 112 include an Internet Protocol (IP) network, an Ethernet network, an InfiniBand (IB) network, a Fibre Channel network, the Internet, a cellular communication network, a wireless communication network, a ground referenced signaling (GRS) link, combinations thereof (e.g., Fibre Channel over Ethernet), variants thereof, and/or the like. In one specific but non-limiting example, the communication network 108 is a network that enables data transmission between the devices 110 and 112 using data signals (e.g., digital, optical, wireless signals).

The device 110 includes a transceiver 116 for sending and receiving signals, for example, data signals. The data signals may be digital or optical signals modulated with data or other suitable signals for carrying data.

The transceiver 116 may include a digital data source 120, a transmitter 124, a receiver 104, and processing circuitry 132 that controls the transceiver 116. The digital data source 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 124 includes suitable software and/or hardware for receiving digital data from the digital data source 120 and outputting data signals according to the digital data for transmission over the communication network 108 to a receiver 104 of device 112. Additional details of the structure of the transmitter 124 are discussed in more detail below with reference to the figures.

The receiver 104 of devices 110 and 112 may include suitable hardware and/or software for receiving signals, such as data signals from the communication network 108. For example, the receiver 104 may include components for receiving processing signals to extract the data for storing in a memory, as described in detail below with respect to FIG. 2-FIG. 4. In at least one embodiment, receiver 104 can include shift logic 115. In some embodiments, shift logic 115 can shift bits received at each data lane of the communication network 108 by one or more unit intervals (UIs) or one or more burst lengths (BLs). For example, training logic 117 can be configured to initiate a frame alignment (e.g., frame recovery training). In such embodiments, receiver 104 can receive a non-aliasing repeating pattern from device 112 at each data lane. The receiver 104 can compare the repeating pattern at each data lane with a stored repeating pattern at training logic 117. If the repeating pattern at a data lane does not match the store repeating pattern, the shift logic 115 can shift the repeating pattern by one or more UIs until the repeating pattern received matches the stored pattern. The training logic 117 can then proceed to align each data lane to the same frame boundary. For example, receiver 104 can receive a counting pattern at each data lane and determine which data lane receives data the earliest. The shift logic 115 at each data lane can compare the value received with the earliest value and shift one or more BLs until the counting pattern received at the data lane matches the earliest value—e.g., shift logic 115 can add burst length shifts to data lanes that are faster to match the slowest data lanes. Additional details regarding the frame alignment are described with reference to FIGS. 2-6.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application-specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control the overall operation of the transceiver 116.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over a channel 109 of the communication network 108. The same or similar structure of the transceiver 116 may be applied to transceiver 136, and thus, the structure of transceiver 136 is not described separately.

Although not explicitly shown, it should be appreciated that devices 110 and 112 and the transceivers 116 and 120 may include other processing devices, storage devices, and/or communication interfaces generally associated with computing tasks, such as sending and receiving data.

Figure 2:
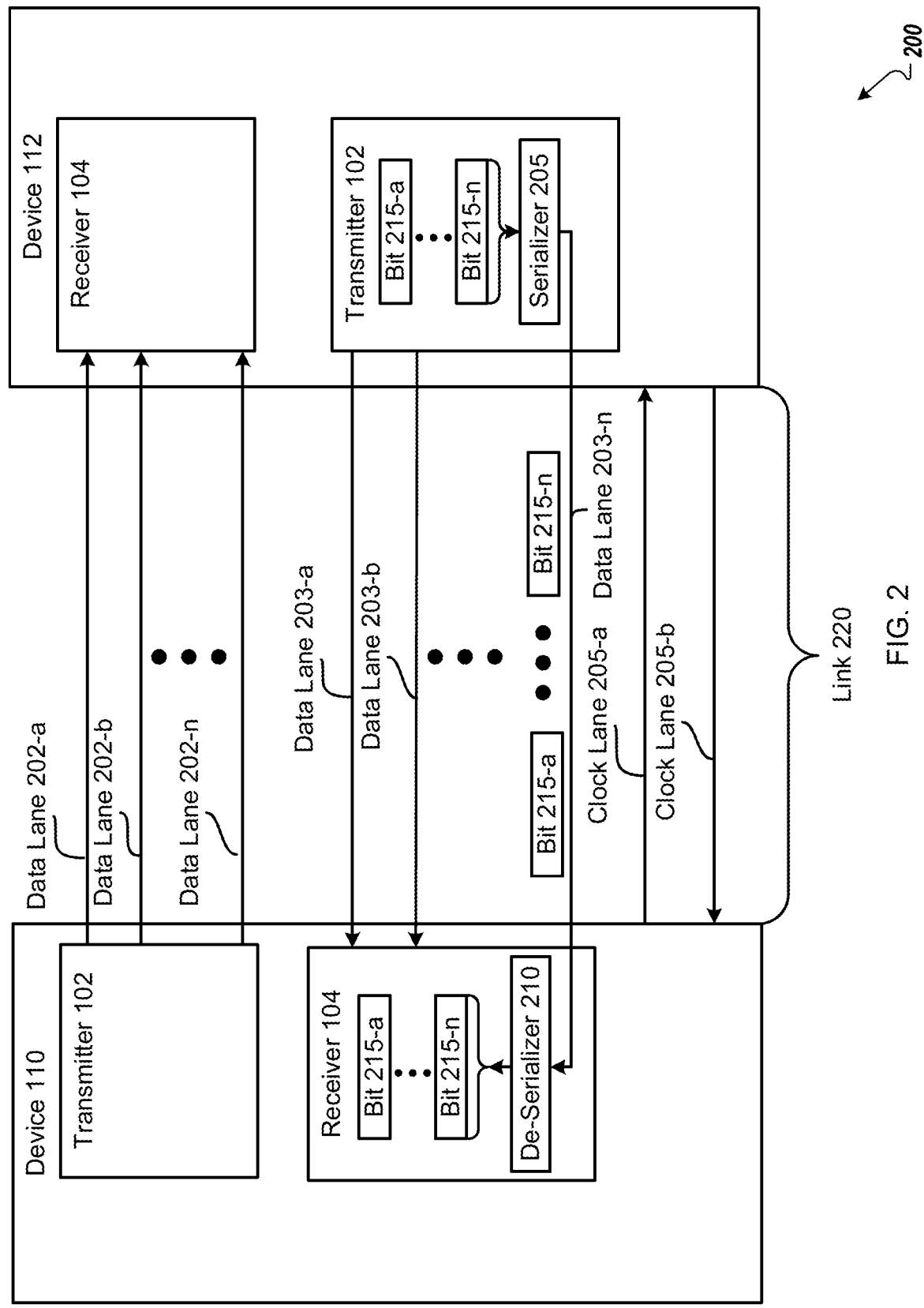
FIG. 2 illustrates an example communication system employing a method for frame alignment recovery, in accordance with at least some embodiments.

FIG. 2 illustrates an example communication system 200 according to at least one example embodiment. The system 200 includes a device 110 and a device 112 as described with reference to FIG. 1. Device 110 and device 112 can include a transmitter 124 and receiver 104 as described with reference to FIG. 1. The device 110 and device 112 can be coupled to a link 220. In at least one embodiment, the link 220 can be an example of communication network 108 as described with reference to FIG. 1. In at least one embodiment, link 220 can be an example of a high-speed interconnect. For example, link 220 can be an example of a ground referenced signaling (GRS) link 220. In an embodiment, the GRS link 220 can be a signaling scheme used for serial data transfer between devices 110 and 112. In at least one embodiment, the GRS link 220 can be a high-speed link (e.g., transferring 40 gigabits per second (GBPS) at a frequency of 20 gigahertz when performing high-speed communications). In at least one embodiment, the link 220 may include RC-dominated channels and LC transmission lines. Additionally, the GRS link 220 may be an on-chip link, a link across a substrate (e.g., organic package), or link signaling over a printed circuit board (PCB). In some examples, GRS link 220 may use a ground network as a signal reference voltage—e.g., the ground may be the return signaling.

In at least one embodiment, the link 220 can include data lanes 202 and data lanes 203 configured to transmit signals, data, messages, etc., between the device 110 and device 112. For example, data lanes 202 can be associated with communicating signals, data, or messages from device 110 to device 112. Data lanes 203 can be associated with communicating signals, data, or messages from device 112 to device 110—e.g., data lanes 202 can be associated with a transmitter 124 of device 110, and data lanes 203 can be associated with a transmitter of device 112. In at least one embodiment, the link 220 can include a same number of data lanes 202 and data lanes 203. In this embodiment, a data lane 202 can be associated with a data lane 203—e.g., data lane 202-a and data lane 203-a can be a single transmitter/receiver data lane pair. In at least one embodiment, the link 220 can include an "N" number of data lane pairs—e.g., an "N" number of data lanes 202 and data lanes 203. In some embodiments, data lanes 202 can be associated with a forwarded clock lane 205-a, and data lanes 203 can be associated with a forwarded clock lane 205-b. In at least one embodiment, each clock lane can be associated with two or more data lanes—e.g., at least two data lanes 202 or data lanes 203. In at least one embodiment, data lanes 202 transmit data to device 112. In such embodiments, the data is latched on the forwarded clock at the receiver 104 of device 112. In some embodiments, data lane 202 and the corresponding data lane 203 are identical—e.g., each data lane 202 and the corresponding data lane 203 support the same signaling speed and include identical drivers and hardware.

In at least one embodiment, transmitter 124 can include a serializer 205, and receiver 104 can include a deserializer 210. In such embodiments, the serializer 205 can serialize parallel data stored at device 110 or device 112 and transmit the serialized data across the link 112. For example, serializer 205 data can serialize bits 215-a through 215-n for transmission across data lane 203-n—e.g., serialize a "B" number of parallel bits for transmission. In such examples, the burst length can be equal to the "B" number of bits transmitted—e.g., the number of bits transmitted in one clock cycle of the transmitter. In some embodiments, each number of "B" can be referred to as a frame. In some embodiments, the transmitter 124 can transmit the bits 215-a through 215-n at a first clock (e.g., the transmitter clock) with a period of "T." The serializer 205 can serialize the data at a second clock that has a period of 2 T/B. That is, the transmitter 104 clock can be slower than the second clock associated with transmitting data over the link 220. The serializer 205 can transmit the bits 215-a through 215-n in series from device 112 to device 110 on data lane 203-n. In some embodiments, the serializer 205 can transmit one bit (e.g., bit 215-a) of the "B" number of bits during one unit interval (UI)—e.g., transmit bit 215-a during a first UI. The transmitter can also transmit the second clock across clock lane 205-b—e.g., the clock associated with the link 220.

The receiver 104 can include a deserializer 210 to deserialize data received from the link 220. That is, the deserializer 210 can recover the parallel data bits 215-a through 215-*n*. To deserialize the data, the deserializer 210 can be configured to divide the second clock received from clock lane 205-*b* to recover the first clock—e.g., the transmitter clock. For example, the deserializer 210 can divide the second clock to generate a recovered parallel clock. In embodiments where device 110 and device 112 are asynchronous (e.g., transmitter clock of device 110 is arbitrarily aligned with a recovered clock of device 112), the recovered clock can be misaligned in phase with the first clock. Accordingly, the communication system 200 can perform a frame alignment recovery training before transmitting data from device 110 to device 112 or from device 112 to device 110. For example, the communication system 200 can utilize a two-phase (e.g., two-stage or two-pass) frame alignment recovery training. In such examples, the device 112 can transmit a non-aliasing repeating pattern to the device 110 at each data lane 203 during the first phase. The receiver 104 can compare the incoming non-aliasing repeating pattern at each data lane 203 with a stored repeating pattern (e.g., the device 112 can transmit a repeating pattern known or stored at both device 110 and device 112). If the pattern received at a data lane 203 is different than the stored pattern, the receiver can shift incoming bits by one or more UIs, as described with reference to FIGS. 3-5, until each data lane is synchronized with respect to a frame boundary. The device 112 can then transmit a count pattern (e.g., an ascending count pattern or descending count pattern) at each data lane 203 during the second phase. The receiver 104 can compare the values received at each data lane 203 and shift one or more BLs as described with reference to FIGS. 3-5 until each data lane is synchronized with respect to a same frame boundary—e.g., each data lane receives the same count value.

Figure 3:
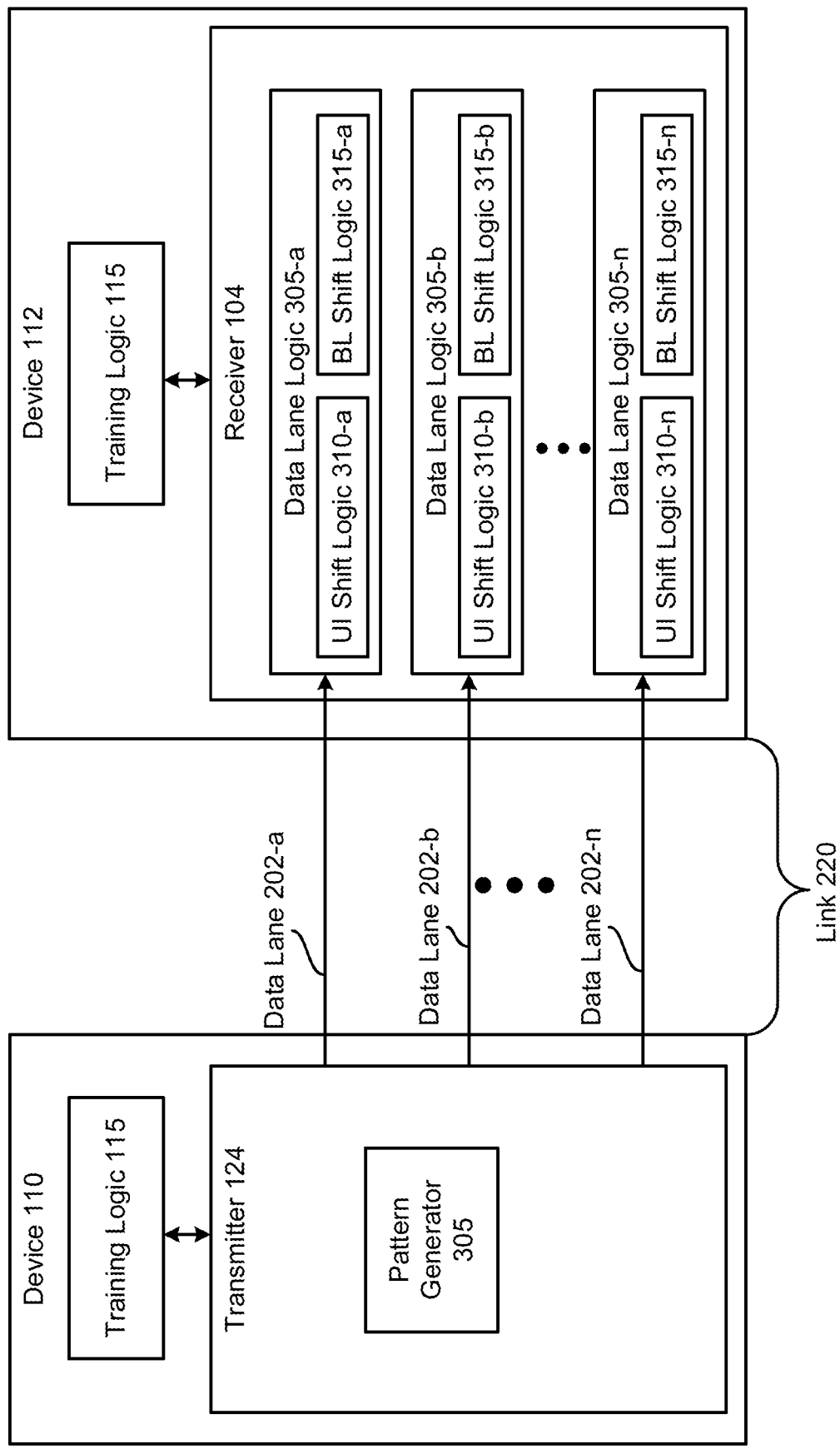
FIG. 3 is an example communication system employing a method for frame alignment recovery, in accordance with at least some embodiments.

FIG. 3 illustrates an example communication system 300 according to at least one example embodiment. In at least one embodiment, communication system 300 is an example of communication system 100 or 200 as described with reference to FIGS. 1 and 2. The system 300 includes a device 110 and a device 112 as described with reference to FIG. 1. The device 110 and device 112 can be coupled to a link 220 as described with reference to FIG. 2—e.g., a GRS link 220. Device 110 can include transmitter 124 as described with reference to FIG. 1, and device 112 can include a receiver 104 as described with reference to FIG. 1. In at least one embodiment, the components illustrated in receiver 104 can be considered a part of shift logic 115 as described with reference to FIG. 1. Although FIG. 3 illustrates a transmitter 124 in device 110 and a receiver 104 for the device 112, device 112 can include a transmitter 124, and device 110 can include a receiver 104 as described with reference to FIG. 2. Transmitter 124 can include pattern generator 305. Receiver 104 can include data lane logic 305 for each data lane 203—e.g., data lane logic 305-*a* for data lane 202-*a*, data lane logic 305-*b* for data lane 202-*b*, etc. In at least one embodiment, receiver 104 can be coupled to training logic 115 or otherwise receive signals from processing circuitry 132 as described with reference to FIG. 1.

In some embodiments, device 110 and device 112 can perform frame alignment recovery as described with reference to FIG. 2. In such embodiments, training logic 115 of either device 110 or device 112 can initiate the frame alignment recovery as part of an initialization sequence. In some embodiments, the training logic 115 can indicate to the pattern generator 305 to transition from a first phase of the frame alignment recovery to a second phase of the frame alignment recovery—e.g., to transition from transmitting a repeated pattern to a count pattern. For example, training logic 110 of device 112 can select a message to transmit to device 110, indicating device 112 is done with the first phase and to transition to the second phase. In an embodiment, training logic 115 can determine a maximum number of unit interval (UI) shifts or burst length (BL) shifts for a respective frame alignment recovery. In such embodiments, the training logic 115 can transmit an error message if the maximum number of UI shifts or BL shifts is satisfied and the data lanes are not yet aligned.

In some embodiments, pattern generator 305 can be configured to generate a pattern to transmit. For example, the pattern generator 305 can generate a repeating pattern (e.g., a non-aliasing repeating pattern) during a first phase of the frame alignment recovery. In some embodiments, the pattern generator 305 can generate the repeating pattern based on a repeating pattern stored at the training logic 115—e.g., the pattern generator 305 can generate a pattern stored at both device 110 and device 112, enabling each device to detect the repeating pattern. In some embodiments, the repeating pattern can be stored in software. In other embodiments, the training pattern can be hardwired. In some embodiments, the pattern generator 305 can generate frames when generating the repeating pattern. For example, the pattern generator 305 can generate frames, each having a same number of bits (e.g., "B" bits as described with reference to FIG. 2). In some embodiments, each frame generated can be the same—e.g., each frame can include the same bits corresponding to the repeating pattern. In an embodiment, pattern generator 305 can be configured to generate a counting pattern (e.g., an ascending or descending pattern) during a second state of the frame alignment recovery. For example, the pattern generator 305 can transmit a pattern that increases (e.g., transmits a value 1, 2, 3, etc.) or decreases (e.g., transmits a value 5, 4, 3, etc.). In some embodiments, the pattern generator can transmit a count value of the counting pattern each clock cycle—e.g., a first value during a first clock cycle, a second value during a second clock cycle, and so forth. In such embodiments, each frame transmitted during the second phase can include one (1) count value. In an embodiment, a start and stop count value of the counting pattern can be set by the training logic 115. For example, the training logic 115 can indicate to the pattern generator 305 to start at a count value one (1). In an embodiment, pattern generator 305 can stop transmitting the repeating pattern or the counting pattern based on signals received from the training logic 115—e.g., the training logic 115 can indicate when to transmit the repeating pattern or the counting pattern. In some embodiments, the pattern generator 305 can generate the pattern at a first clock (e.g., the first clock as described with reference to FIG. 2). In such embodiments, the pattern (e.g., the repeating pattern or count pattern) can be serialized and sent across the link 220 at a second clock (e.g., the second clock as described with reference to FIG. 2).

In an embodiment, data lane logic 305 can be configured to receive frames (e.g., the B" bits) and the count values from a corresponding data lane 202—e.g., the data lane logic 305 can receive the repeating pattern or the counting pattern from the corresponding data lane 202. In some embodiments, the receiver 104 or data lane logic 305 can be configured to deserialize the frames received to recover the original frames as described with reference to FIG. 2. In an embodiment, during the first phase of the frame alignment recovery, the data lane logic 305-*a* can be configured to compare incoming bits corresponding to a frame size with the repeating pattern stored at the training logic 115. For example, data lane logic 305-*a* can compare the first "B" bits received on data lane 202-*a* with the repeating stored pattern. If the data lane logic 305 determines the incoming "B" bits satisfy (e.g., do match or are the same as) the repeating pattern, the data lane logic 305 can refrain from performing additional operations during the first phase of the frame alignment recovery. If the data lane logic 305 determines the incoming "B" bits do not satisfy (e.g., do not match or are not the same as) the repeating pattern, UI shift logic 310 of the data lane logic 305 is configured to shift the incoming bits by one UI. For example, if the first "B" bits received on data lane 202-*a* do not match the stored repeating pattern, the UI shift logic 310-*a* can skip the subsequent bit received after the first "B" bits (e.g., shift by one (1) UI) and then compare the next set of "B" bits received after the skipped bit with the stored repeating pattern. That is, when shifting by one UI, the data lane logic 305 can skip a bit when detecting the pattern. The data lane logic 305 can continue to compare and have the UI shift logic 310 shift by one UI until a set of "B" bits received match the stored repeating pattern at each data lane 305.

In some embodiments, data lane logic 305 can be configured to receive count values during the second phase of the frame alignment recovery. For example, each data lane logic 305 can receive a count value corresponding to the count pattern during each clock cycle (e.g., each clock cycle of the recovered clock as described with reference to FIG. 2). In at least one embodiment, training logic 115 can receive the count values from each data lane 202 and determine the earliest data lane 202—e.g., determine which data lane 202 receives an earliest count value. For example, training logic 115 can receive a count value three (3) from data lane 202-*a* and a count value two (2) from data lane 202-*b*. The training logic 115 can determine the data lane 202-*b* receives the earliest count value if the count pattern is ascending (e.g., the data lane 202-*b* is the earliest data lane 202 to receive the count value two (2)) or determine data lane 202-*a* receives the earliest count value if the count pattern is descending—e.g., data lane 202-*a* is the first data lane 202 to receive the count value three (3). Each data lane logic 305 can be configured to compare a count value received from the corresponding data lane 202-*a* with the earliest count value determined. For example, data lane 202-*a* can compare the count value three (3) with the earliest count value determined—e.g., with the count value two (2). After the comparison, each data lane logic 305 can determine whether to shift the incoming bits—e.g., determine whether to add a burst length shift. For example, the data lane logic 305 determines the count value received does not satisfy (e.g., is different than) the earliest count value, the data lane logic 305 can cause the BL shift logic 315 to add one or more burst length shifts to cause the received count value to match the earliest count value—e.g., cause BL shift logic 315-*a* to add one burst length shift to cause the count value received at data lane 202-*a* to be two (2), matching the earliest count value. If the data lane logic 305 determines the count value received does satisfy the earliest count value, the data lane logic 305 can refrain from performing additional operations during the second phase. Accordingly, the data lane logic 305 can be configured to align data received at each data lane 202 with respect to the same frame boundary during the frame alignment recovery.

Figure 4:
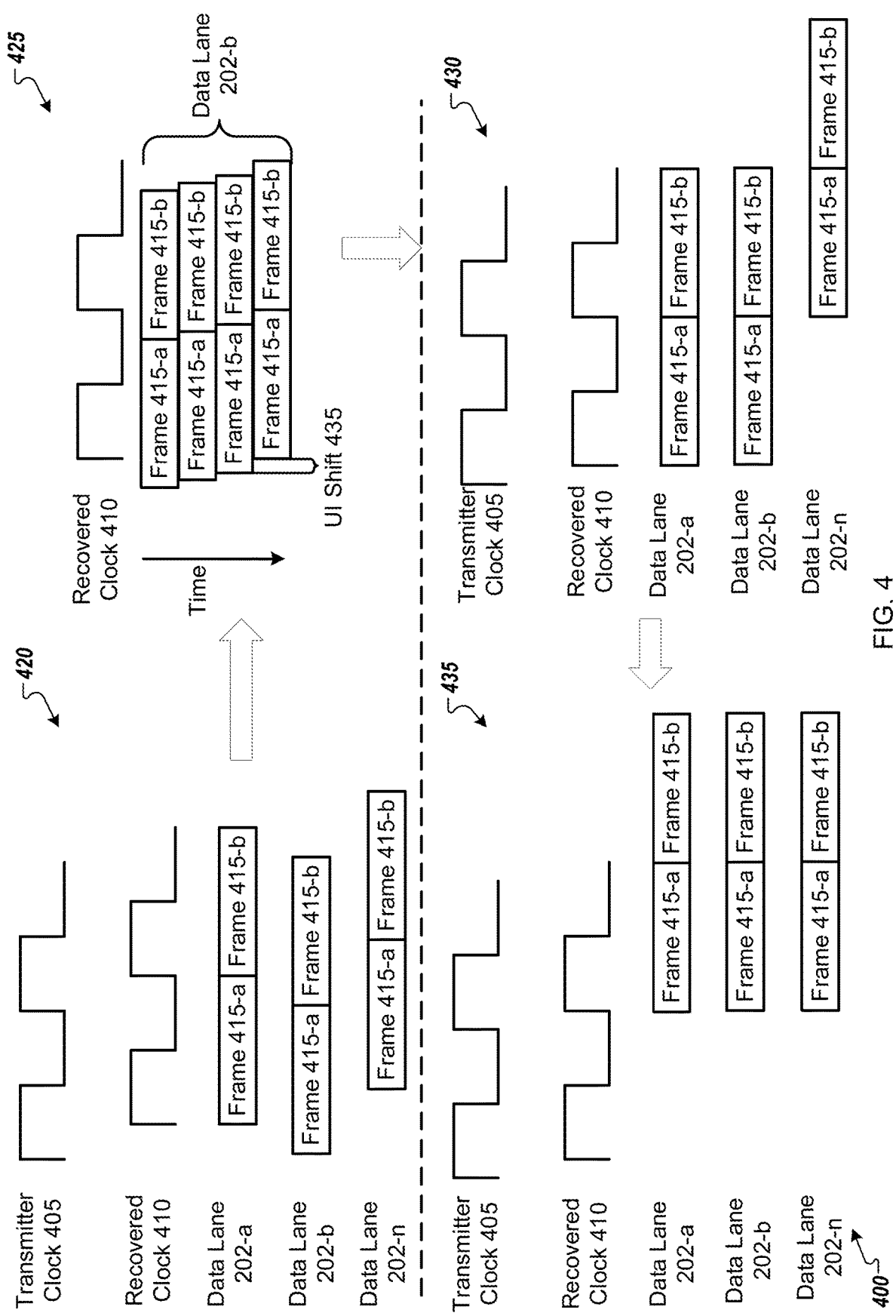
FIG. 4 is a diagram of a method for frame alignment recovery for a high-speed interconnect system, in accordance with at least some embodiments.

FIG. 4 illustrates an example diagram of a method 400 for frame alignment recovery for a high-speed interconnect. The method 400 can be performed by processing logic comprising hardware, software, firmware, or any combination thereof. In at least one embodiment, the method 400 is performed by the transmitter 124 or receiver 104 of the first device 110 or second device 112 as described with reference to FIG. 3—e.g., by the pattern generator 305, training logic 115, and data lane logic 305. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a method for frame alignment recovery are possible. In an embodiment, operations 420 and 425 can be associated with a first phase of the frame alignment recovery, and operations 430 and 435 can be associated with a second phase of the frame alignment recovery.

At operation 420, the transmitter 124 can transmit a repeating pattern as described with reference to FIGS. 2 and 3. In some embodiments, each frame 415 transmitted can include a same number of bits, where each frame 415 is the same—e.g., frame 415-*a* is the same as frame 415-*b*. In an embodiment, the recovered clock 410 generated by the receiver 104 can be misaligned with respect to the transmitter clock 405 as described with reference to FIG. 2. Accordingly, the frames 415 recovered by the receiver at each data lane 202 can be misaligned with respect to the recovered clock 410. For example, the recovered frame 415-*a* at data lane 202-*b* can be misaligned and received before a rising edge of the recovered clock 410, while the recovered frame 415-*a* at data lane 202-*n* can be misaligned and received after a rising edge of the recovered clock 410. In some embodiments, even if the transmitter clock 405 and the recovered clock 410 are aligned, the frames 415 received at each data lane 202 can be misaligned due to data lane 202 skew as described above—e.g., due to different routings and physical deviations of the data lanes 202 during the manufacturing process.

At operation 425, the data lane logic 305 at each data lane 202 can compare the incoming bits with the repeating pattern stored at training logic 115 as described with reference to FIG. 3. In an embodiment, the data lane logic 305 can determine the incoming bits satisfy (e.g., match) the repeating pattern. For example, data lane logic 305-*a* can determine a first set of bits received corresponding to a frame size satisfy the repeating pattern—e.g., frame 415-*a* is aligned with the recovered clock 410. In an embodiment, the data lane logic 305 can determine the incoming bits do not satisfy (e.g., do not match) the repeating pattern. For example, data lane logic 305-*b* can determine that the first set of bits received corresponding to the frame size does not satisfy the repeating pattern—e.g., frame 415 is not aligned with the recovered clock 410. In such embodiments, the UI shift logic 310-*b* can shift the incoming bits by one UI shift 435. After the shift, the data lane logic 305-*b* can determine a second set of bits (the bits received after skipping one bit following the first set of bits) received corresponding to the frame size do not satisfy the repeating pattern—e.g., frame 415-*a* is not aligned with respect to the recovered clock 410 after the first shift. In such embodiments, the UI shift logic 310-*b* can shift the incoming bits by one UI shift 435 again. The data lane logic 305-*b* and UI shift logic 310-*b* can continue shifting by one UI shift 435 until the incoming bits match the stored repeated pattern—e.g., until frame 415-*a* is aligned with the recovered clock at data lane 202-*b*. In some embodiments, each data lane logic 305 can shift the bits received one UI shift 435 at a time until all frame 415 received at each data lane are aligned with respect to the recovered clock 410.

At operation 430, the transmitter 124 can transmit a count pattern as described with reference to FIGS. 2 and 3. In an embodiment, after operation 425, though each frame 415 can be aligned with respect to the recovered clock 410, the frames 415 can be misaligned with respect to the other data lanes 202. For example, the frame 415-a received at data lane 202-n can be aligned with a different clock edge than the frames 415-a received data lane 202-a and data lane 202-b. Accordingly, the transmitter 124 can transmit a count value for each clock cycle on each data lane 202. In such embodiments, the data lane logic 305 at each data lane 202 can send the received count value to the training logic 115. In an embodiment, the training logic 115 can determine the earliest count value—e.g., determine a count value received at data lane 202-n is earlier than count values received at data lane 202-a and data lane 202-b as the data lane 202-n is synchronized with a different edge of the recovered clock 410. The training logic 115 can transmit the earliest count value back to each data lane logic 305. In some embodiments, each data lane logic 305 can compare the count value received from the corresponding data lane 202 with the earliest count value determined. If the data lane logic 305 determines the count value received is the same as the earliest count value, the data lane logic 305 can refrain from adding a BL shift. For example, data lane logic 305-n can determine the count value received satisfies the earliest count value and refrain from adding a burst length shift. If the data lane logic 305 determines the count value received is different than the earliest count value, the data lane logic 305 can add one or more BL shifts. For example, data lane logic 305-a can cause the BL shift logic 315-a to add one BL shift. In an embodiment, adding one BL shift can cause the incoming pattern to shift a full clock cycle.

At operation 435, the transmitter 124 can stop transmitting the count pattern. In an embodiment, after the BL shift logic 315 adds one or more BL shifts, each data lane 202 can be synchronized with respect to the same frame boundary. For example, each recovered frame 415-a at the receiver 104 can be aligned to the same rising edge of the recovered clock 410. Because each data lane 202 is synchronized with respect to the same frame boundary, the training logic 115 can indicate to the transmitter 124 to stop transmitting the counting pattern—e.g., indicate the end of the frame alignment recovery. In at least one embodiment, the method described herein can be utilized to synchronize the data lanes 203—e.g., synchronize data transmissions from device 112 to device 110.

Figure 5:
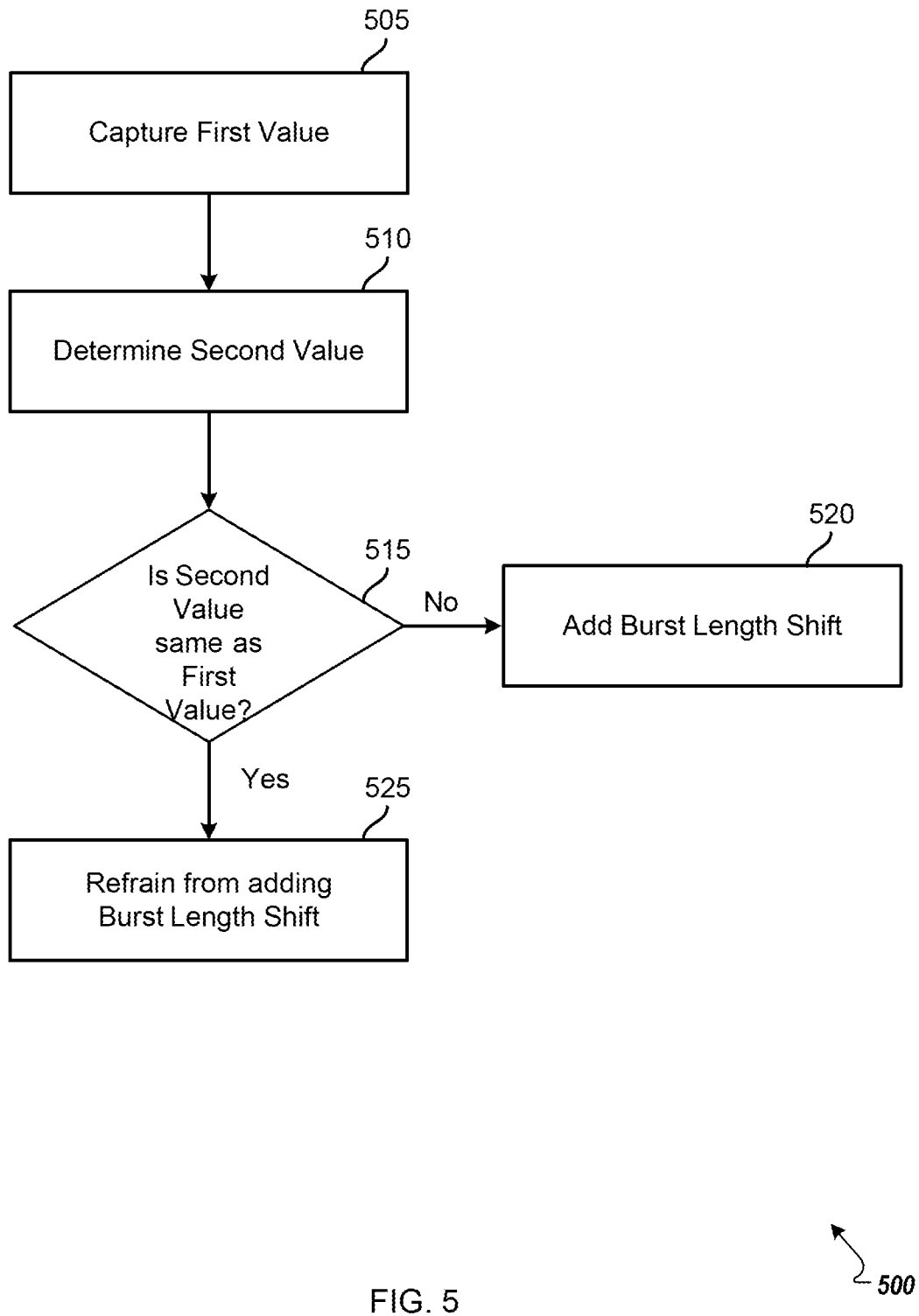
FIG. 5 is a flow diagram of a method for frame alignment recovery, in accordance with at least some embodiments.

FIG. 5 illustrates an example flow diagram of a method 500 for frame alignment recovery for a high-speed interconnect. The method 500 can be performed by processing logic comprising hardware, software, firmware, or any combination thereof. In at least one embodiment, the method 500 is performed by the transmitter 124 or receiver 104 of the first device 110 or second device 112 as described with reference to FIG. 3—e.g., by the pattern generator 305, training logic 115, and data lane logic 305. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a method for frame alignment recovery are possible.

At operation 505, each data lane logic 305 can capture (e.g., receive) a first value. For example, each data lane logic 305 can receive a first count value corresponding to a counting pattern transmitted by transmitter 124 as described with reference to FIGS. 3 and 4. In an embodiment, training logic 115 can enable value capture—e.g., enable each logic lane 305 to detect the count values. In at least one embodiment, each data lane logic 305 can latch the count value received from the corresponding data lane 202. In an embodiment, the data lane logic 305 can latch the count value received at each clock cycle—e.g., each clock cycle of the recovered clock 410.

At operation 510, the training logic 115 (or each data lane logic 305) can determine a second value—e.g., determine an earliest count value as described with reference to FIGS. 3 and 4. For example, the training logic 115 can compare each count value latched at the respective data lane logic 305. In an embodiment, the training logic 115 can determine a minimum count value each data lane 202 can be synchronized at for an ascending count pattern or determine a maximum count value each data lane 202 can be synchronized at for a descending count pattern. For example, if data lanes 202-a, 202-b, and 202-n receive count values four (4), four (4), three (3), respectively, the training logic 115 can determine the earliest value is three (3) for an ascending count pattern and determine the earliest value is four (4) for a descending count pattern.

At operation 515, each data lane logic 305 can determine if the second value is the same as the first value—e.g., determine if the count value received at the respective data lane 202 is the same as the earliest count value. For example, each data lane logic 305 can compare the first count value with the second count value. If the data lane logic 305 determines the first count value is different than the second count value, data lane logic 305 can proceed to operation 520. If the data lane logic 305 determines the first count value is the same as the second count value, data lane logic 305 can proceed to operation 525.

At operation 520, BL shift logic 315 can add one or more burst length shifts 435. In some embodiments, BL shift logic 315 can determine a difference between the first value and the second value—e.g., determine a difference between the earliest count value and the received count value. For example, the BL shift logic 315 can determine a difference of five (5) between the first count value and the second count value. In at least one embodiment, the BL shift logic 315 can add a number of BL shifts corresponding to the difference—e.g., add five (5) BL shifts when the difference between the first count value and the second count value is five (5). Accordingly, the BL shift logic 315 can cause the first count value received at the respective data lane to satisfy (e.g., match) the second count value after adding the BL shifts.

At operation 525, BL shift logic 315 can refrain from adding BL shifts 435. For example, the BL shift logic 315 determines the first value is the same as the second value (e.g., the received count value is the same as the earliest count value), the BL shift logic 315 can refrain from adding BL shift. Accordingly, after operations 520 and 525, each of the data lanes can be synchronized with respect to the same frame boundary.

Figure 6:
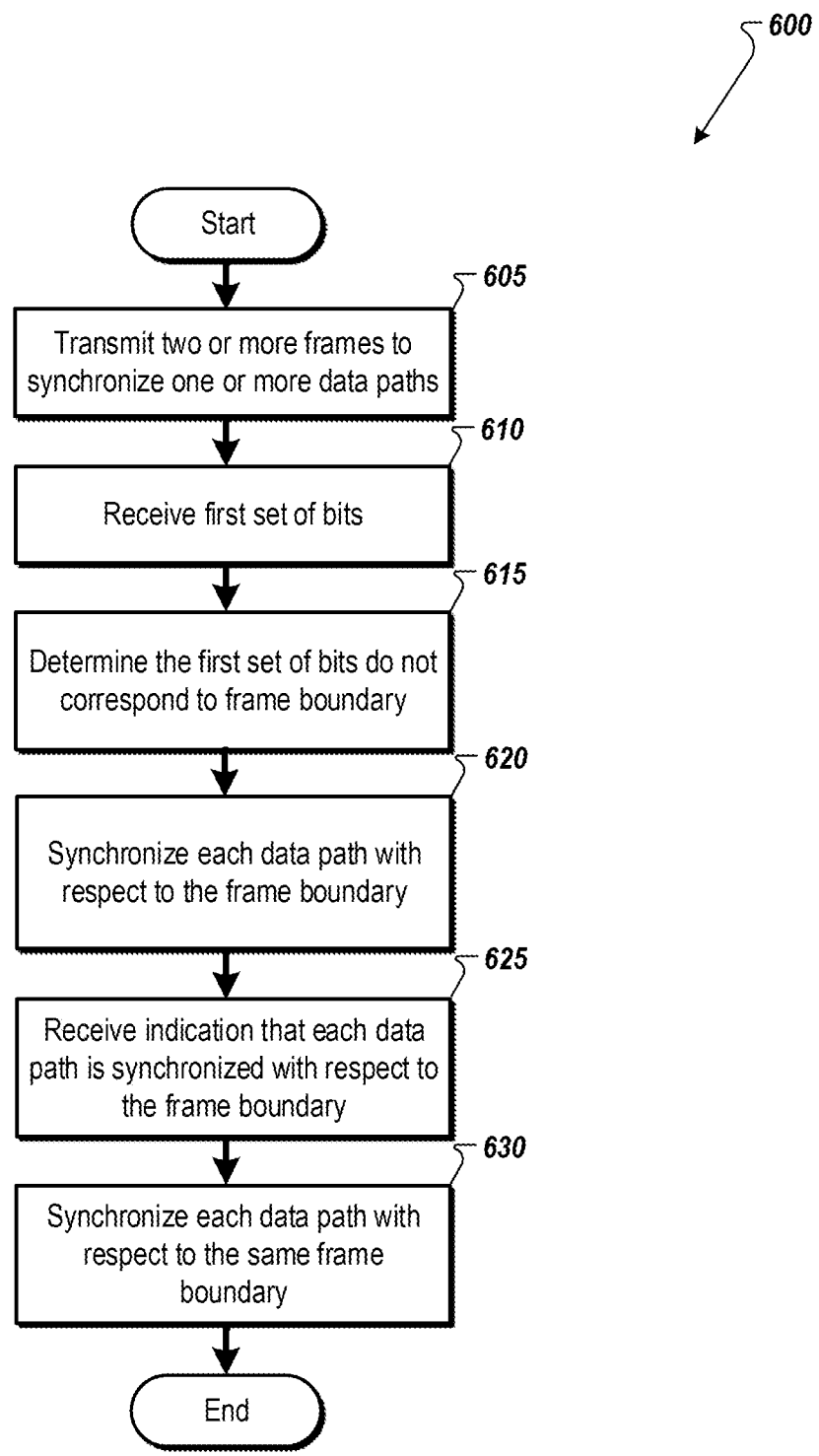
FIG. 6 is a flow diagram of a method for frame alignment recovery for a high-speed interconnect system, in accordance with at least some embodiments.

FIG. 6 illustrates an example flow diagram of a method 600 for frame alignment recovery for a high-speed interconnect. The method 600 can be performed by processing logic comprising hardware, software, firmware, or any combination thereof. In at least one embodiment, the method 600 is performed by the transmitter 124 or receiver 104 of the first device 110 or second device 112 as described with reference to FIG. 3—e.g., by the pattern generator 305, training logic 115, and data lane logic 305. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a method for frame alignment recovery are possible. In an embodiment, method 600 can illustrate the second phase of the frame alignment recovery as described with reference to FIGS. 3 and 4.

At operation 605, processing logic can transmit two or more frames on a link having one or more data lanes to synchronize the one or more data lanes, where each frame comprises a quantity of bits (e.g., a "B" number of bits as described with reference to FIG. 2). In at least one embodiment, the processing logic can transmit a non-aliasing repeating pattern corresponding to the quantity of bits. In at least one embodiment, the non-aliasing repeating pattern is stored on both a first device and a second device. In an embodiment, the link is coupled with the first device. In at least one embodiment, each frame of the two or more frames is the same—e.g., each frame includes the same bits.

At operation 610, processing logic can receive a first set of bits from each data lane corresponding to the quantity of bits in each frame of the two or more frames. In an embodiment, the first set of bits can be received at the second device coupled to the link At operation 615, processing logic can determine that the first set of bits received from a data lane of the one or more data lanes does not correspond to a frame boundary of the two or more frames. In an embodiment, the processing logic can compare the first set of bits received at each data lane with a stored pattern (e.g., a pattern stored at training logic 115). In at least one embodiment, the processing logic can determine the first set of bits received is different than the stored pattern, where determining that the first set of bits that the first set of bits received at the data lane does not correspond to the frame boundary of the two or more frames is responsive to determining the first set of bits is different than the stored pattern. In at least one embodiment, the processing logic can determine that the first set of bits received from the data lane of the one or more data lanes does correspond to the frame boundaries. In such embodiments, the processing logic can refrain from adding one or more unit interval (UI) shifts to the first set of bits.

At operation 620, processing logic can synchronize each data lane of the one or more data lanes with respect to the frame boundary, responsive to determining that the first set of bits does not correspond to the frame boundary. In one embodiment, to synchronize each data lane, the processing logic can shift the first set of bits received at the data lane of the one or more data lanes by one or more unit intervals (UIs) in response to determining the first set of bits does not correspond to the frame boundary. In some embodiments, the processing logic can further transmit, to the first device, an indication that each data lane of the one or more data lanes is synchronized with respect to the frame boundary responsive to shifting the first set of bits received at the data lane. In some embodiments, the processing logic can compare the shifted first set of bits (e.g., the first set of bits shifted by one UI) with a stored pattern. In such embodiments, the processing logic can determine the shifted first set of bits are associated with the stored pattern, where transmitting the indication the one or more data lanes are synchronized with respect to the frame boundary is responsive to determining the shifted first set of bits are associated with the stored pattern. In at least one embodiment, the processing logic can determine that the shifted first set of bits does not correspond to the stored pattern. In such embodiments, the processing logic can shift the shifted first set of bits by an additional one or more UIs to receive a second shifted first set of bits responsive to determining the shifted first set of bits do not correspond to the stored pattern. The processing logic can compare the second shifted first set of bits with the stored pattern. In one embodiment, the processing logic can determine the second shifted first set of bits are associated with the stored pattern, where transmitting the indication the one or more data lanes are synchronized with respect to the frame boundary is responsive to determining the second shifted first set of bits are associated with the stored pattern.

At operation 625, the processing logic can receive, at the first device, the indication that each of the one or more data lanes is synchronized with respect to the frame boundary. In such embodiments, the processing logic can transmit a second set of frames on each data lane of the one or more data lanes, each frame of the second set of frames including a value (e.g., a count value) and transmitted during a clock cycle of a transmitter clock. In some embodiments, the second set of frames is associated with a counting pattern. In at least one embodiment, the counting pattern is an ascending counting pattern. In some embodiments, the counting pattern is a descending counting pattern.

At operation 630, the processing logic can synchronize each data lane with respect to the same frame boundary—e.g., perform the second phase of the frame alignment recovery as described with reference to FIGS. 3-5. In some embodiments, to synchronize each data lane with respect to the same frame boundary, the processing logic can receive the second set of frames on each data lane of the one or more data lanes. In an embodiment, the processing logic can determine that a value received at the data lane of the one or more data lanes is different than a value received at the remaining data lanes of the one or more data lanes. For example, the processing logic can determine a first value (e.g., an earliest value as described with reference to FIG. 5) in the second set of frames received at the one or more data lanes in response to receiving the second set of frames on each data lane. In some embodiments, the processing logic can compare the first value in the second set of frames with each remaining value (e.g., the count value received at each respective data lane) received at the remaining data lanes, where determining that the value received at the data lane is different than the value received at the remaining data lanes is based at least in part on comparing the first value in the second set of frames with the remaining values received at the one or more data lanes.

In at least one embodiment, the processing logic can shift the second set of frames received at the data lane by one burst unit interval (BUI) in response to determining that the value at the data lane is different. In an embodiment, the processing logic can compare a shifted value generated after shifting the second set of frames received at the data lane to the values received at the remaining data lanes of the one or more data lanes. In such embodiments, the processing logic can determine the shifted value received at the data lane is the same as the values received at the remaining data lanes of the one or more data lanes, where transmitting the indication that the frame boundary is the same for each data lane of the one or more data lanes is responsive to determining the shifted value received at the data lane is the same.

In at least one embodiment, the processing logic can compare the shifted value generated after shifting the second set of frames received at the data lane to the values received at the remaining data lanes of the one or more data lanes. In such embodiments, the processing logic can determine that the shifted value at the data lane is different than the values received at the remaining data lanes of the one or more data lanes. In some embodiments, the processing logic can shift the shifted value at the data lane by one BUI to generate a second shifted value in response to determining that the shifted value is different. In such embodiments, the processing logic can compare the second shifted value at the data lane to the values received at the remaining data lanes of the one or more data lanes. In some embodiments, the processing logic can determine the second shifted value at the data lane is the same as the values received at the remaining data lanes of the one or more data lanes, where transmitting the indication that the frame boundary is the same for each data lane of the one or more data lanes is responsive to determining the second shifted value received at the data lane is the same. In some embodiments, the processing logic can transmit, to the first device, an indication that the frame boundary is the same for each data lane of the one or more data lanes responsive to the shifting the second set of frames at the data lane.

Figure 7:
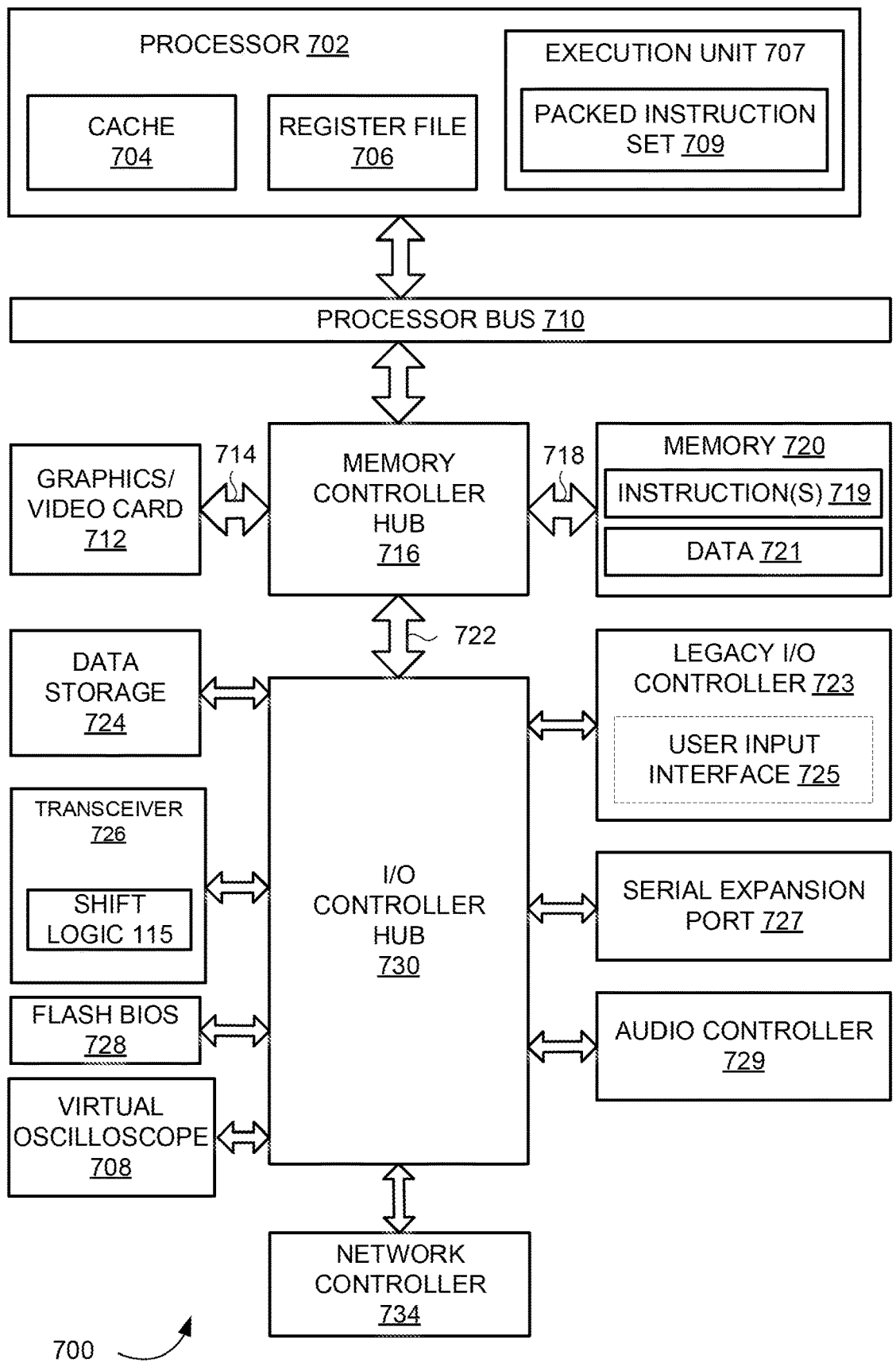
FIG. 7 illustrates an example computer system including a transceiver including a chip-to-chip interconnect for frame alignment recovery, in accordance with at least some embodiments.

FIG. 7 illustrates a computer system 700 including a transceiver including a chip-to-chip interconnect, in accordance with at least one embodiment. In at least one embodiment, computer system 700 may be a system with interconnected devices and components, an SOC, or some combination. In at least one embodiment, computer system 700 is formed with a processor 702 that may include execution units to execute an instruction. In at least one embodiment, computer system 700 may include, without limitation, a component, such as processor 702, to employ execution units including logic to perform algorithms for processing data. In at least one embodiment, computer system 700 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 700 may execute a version of WINDOWS' operating system available from Microsoft Corporation of Redmond, Wash., although other operating systems (UNIX and Linux for example), embedded software, and/or graphical user interfaces may also be used.

In at least one embodiment, computer system 700 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 700 may be used in devices such as graphics processing units (GPUs), network adapters, central processing units and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 700 may include, without limitation, processor 702 that may include, without limitation, one or more execution units 707 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 700 is a single-processor desktop or server system. In at least one embodiment, computer system 700 may be a multiprocessor system. In at least one embodiment, processor 702 may include, without limitation, a CISC microprocessor, a RISC microprocessor, a VLIW microprocessor, a processor implementing a combination of instruction sets, or any other processor device, such as a digital signal processor, for example. In at least one embodiment, processor 702 may be coupled to a processor bus 710 that may transmit data signals between processor 702 and other components in computer system 700.

In at least one embodiment, processor 702 may include, without limitation, a Level 1 ("L1") internal cache memory ("cache") 704. In at least one embodiment, processor 702 may have a single internal cache or multiple levels of internal cache. In at least one embodiment, cache memory may reside external to processor 702. In at least one embodiment, processor 702 may also include a combination of both internal and external caches. In at least one embodiment, a register file 706 may store different types of data in various registers including, without limitation, integer registers, floating point registers, status registers, and instruction pointer register.

In at least one embodiment, execution unit 707, including, without limitation, logic to perform integer and floating point operations, also resides in processor 702. Processor 702 may also include a microcode ("ucode") read only memory ("ROM") that stores microcode for certain macro instructions. In at least one embodiment, execution unit 702 may include logic to handle a packed instruction set 709. In at least one embodiment, by including packed instruction set 709 in an instruction set of a general-purpose processor 702, along with associated circuitry to execute instructions, operations used by many multimedia applications may be performed using packed data in a general-purpose processor 702. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 700 may include, without limitation, a memory 720. In at least one embodiment, memory 720 may be implemented as a DRAM device, an SRAM device, flash memory device, or other memory device. Memory 720 may store instruction(s) 719 and/or data 721 represented by data signals that may be executed by processor 702.

In at least one embodiment, a system logic chip may be coupled to processor bus 710 and memory 720. In at least one embodiment, the system logic chip may include, without limitation, a memory controller hub ("MCH") 716, and processor 702 may communicate with MCH 716 via processor bus 710. In at least one embodiment, MCH 716 may provide a high bandwidth memory path 718 to memory 720 for instruction and data storage and for storage of graphics commands, data and textures. In at least one embodiment, MCH 716 may direct data signals between processor 702, memory 720, and other components in computer system 700 and to bridge data signals between processor bus 710, memory 720, and a system I/O 722. In at least one embodiment, a system logic chip may provide a graphics port for coupling to a graphics controller. In at least one embodiment, MCH 716 may be coupled to memory 720 through high bandwidth memory path 718, and graphics/video card 712 may be coupled to MCH 716 through an Accelerated Graphics Port ("AGP") interconnect 714.

In at least one embodiment, computer system 700 may use system I/O 722 that is a proprietary hub interface bus to couple MCH 716 to I/O controller hub ("ICH") 730. In at least one embodiment, ICH 730 may provide direct connections to some I/O devices via a local I/O bus. In at least one embodiment, a local I/O bus may include, without limitation, a high-speed I/O bus for connecting peripherals to memory 720, a chipset, and processor 702. Examples may include, without limitation, an audio controller 729, a firmware hub ("flash BIOS") 728, a transceiver 726, a data storage 724, a legacy I/O controller 723 containing a user input interface 725 and a keyboard interface, a serial expansion port 727, such as a USB, and a network controller 734. Data storage 724 may comprise a hard disk drive, a floppy disk drive, a CD-ROM device, a flash memory device, or other mass storage device. In an embodiment, the transceiver 726 includes a constrained FFE 708.

In at least one embodiment, FIG. 7 illustrates a system, which includes interconnected hardware devices or "chips" in the transceiver 726—e.g., the transceiver 726 includes a chip-to-chip interconnect including the first device 110 and second device 112 as described with reference to FIG. 1). In at least one embodiment, FIG. 7 may illustrate an exemplary SoC. In at least one embodiment, devices illustrated in FIG. 7 may be interconnected with proprietary interconnects, standardized interconnects (e.g., PCIe), or some combination thereof and utilize a GRS link 220 as described with reference to FIG. 2. In at least one embodiment, one or more components of system 700 are interconnected using compute express link ("CXL") interconnects. In an embodiment, the transceiver 726 can include shift logic 115 as described with reference to FIG. 1. In such embodiments, the shift logic 115 can facilitate a method for frame alignment on a high-speed interconnect as described above. In an embodiment, shift logic 115 can shift incoming bits at each data lane by one or more UIs or one or more BLs. For example, the shift logic 115 can shift the incoming bits at each data lane by one or more UIs to synchronize each data lane with respect to a frame boundary. The shift logic 115 can also shift the incoming bits at each data lane by one or more BLs to synchronize each data lane with respect to the same frame boundary. Accordingly, the shift logic 115 can be configured for frame alignment recovery as described with reference to FIGS. 2-6.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances. Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A receiver device comprising:
    a plurality of data lanes;
    per-lane unit interval (UI) shift logic coupled to the plurality of data lanes, wherein each of the plurality of data lanes receives, from a transmitter device, an incoming data stream having a same pattern repeated at a number of clock cycles and the per-lane UI shift logic is to shift the incoming data stream one UI at a time until a shifted data pattern matches an expected data pattern on each data lane; and
    per-lane burst length (BL) shift logic coupled to the plurality of data lanes, wherein each of the plurality of data lanes receives, from the transmitter device, a count value at every clock cycle and the per-lane BL shift logic is to shift one or more BLs until each data lane receives a same count value, representing the plurality of data lanes being synchronized with respect to a same frame boundary.

2. The receiver device of claim 1, wherein the plurality of data lanes is part of a ground-referenced signaling (GRS) link.

3. The receiver device of claim 1, wherein the plurality of data lanes is part of a chip-to-chip (C2C) interconnect.

4. The receiver device of claim 1, wherein the plurality of data lanes receives the incoming data stream asynchronously from the transmitter device.

5. The receiver device of claim 1, further comprising training logic coupled to the per-lane UI shift logic, wherein the training logic is to:
   store the expected data pattern;
   initiate frame recovery training of the plurality of data lanes;
   determine whether a pattern received at each data lane is synchronized with respect to a frame boundary by comparing incoming bits of the incoming data stream with the expected data pattern, wherein the expected data pattern is a non-aliasing pattern; and
   responsive to a determination that the incoming bits at the respective data lane do not correspond to the frame boundary, cause the per-lane UI shift logic to shift the incoming bits by one or more UIs until the incoming bits correspond to the frame boundary, wherein the incoming bits correspond to the frame boundary when the shifted data pattern matches the expected data pattern on the respective data lane.

6. The receiver device of claim 5, wherein the training logic, after each data of the plurality of data lanes is synchronized with respect to the frame boundary, is further to align each data lane to the same frame boundary by comparing the count value received at the respective data lane with an earliest count value received at one of the plurality of data lanes and causing the per-lane BL shift logic to shift the one or more BLs until the count value received at the respective data lane matches the earliest count value.

7. The receiver device of claim 5, wherein the training logic, after each data of the plurality of data lanes is synchronized with respect to the frame boundary, is further to:
   determine an earliest count value received across the plurality of data lanes;
   determine which of the plurality of data lanes are not synchronized with respect to the other data lanes; and
   cause the per-lane BL shift logic to shift an incoming count pattern at data lanes receiving a count value different from the earliest count value by adding one or more burst lengths (BLs) until each data lane receives the same count value.

8. The receiver device of claim 1, further comprising training logic coupled to the per-lane UI shift logic, wherein the training logic is to:
   transmit, to the transmitter device, an indication that the plurality of data lanes are synchronized with respect to the same frame boundary.

9. A communication system comprising:
   a transmitter device to store a bit pattern and to transmit the bit pattern on each of a plurality of data lanes repeatedly at a number of clock cycles; and
   a receiver device to receive, from the transmitter device, the bit pattern repeated at the number of clock cycles, wherein the receiver device comprises:
      per-lane unit interval (UI) shift logic coupled to the plurality of data lanes, wherein each of the plurality of data lanes receives, from the transmitter device, an incoming data stream having the bit pattern repeated at the number of clock cycles and the per-lane UI shift logic is to shift the incoming data stream one UI at a time until a shifted data pattern matches an expected data pattern on each data lane; and
      per-lane burst length (BL) shift logic coupled to the plurality of data lanes, wherein each of the plurality of data lanes receives, from the transmitter device, a count value at every clock cycle and the per-lane BL shift logic is to shift one or more BLs until each data lane receives a same count value, representing the plurality of data lanes being synchronized with respect to a same frame boundary.

10. The communication system of claim 9, further comprising a ground-referenced signaling (GRS) link comprising the plurality of data lanes.

11. The communication system of claim 9, further comprising a chip-to-chip (C2C) interconnect comprising the plurality of data lanes.

12. The communication system of claim 9, wherein the plurality of data lanes receives the incoming data stream asynchronously from the transmitter device.

13. The communication system of claim 9, wherein the transmitter device comprises first training logic to store the bit pattern, wherein the bit pattern is a non-aliasing pattern, wherein the receiver device comprises second training logic coupled to the per-lane UI shift logic, wherein the second training logic is to:
   store the non-aliasing pattern as the expected data pattern;
   initiate frame recovery training of the plurality of data lanes;
   determine whether a pattern received at each data lane is synchronized with respect to a frame boundary by comparing incoming bits of the incoming data stream with the expected data pattern, wherein the expected data pattern is a non-aliasing pattern; and
   responsive to a determination that the incoming bits at the respective data lane do not correspond to the frame boundary, cause the per-lane UI shift logic to shift the incoming bits by one or more UIs until the incoming bits do correspond to the frame boundary, the incoming bits correspond to the frame boundary when the shifted data pattern matches the expected data pattern on the respective data lane.

14. The communication system of claim 13, wherein the second training logic, after each data of the plurality of data lanes is synchronized with respect to the frame boundary, is further to align each data lane to the same frame boundary by comparing the count value received at the respective data lane with an earliest count value received at one of the plurality of data lanes and causing the per-lane BL shift logic to shift the one or more BLs until the count value received at the respective data lane matches the earliest count value.

15. The communication system of claim 14, wherein the second training logic, after each data of the plurality of data lanes is synchronized with respect to the frame boundary, is further to:
   determine an earliest count value received across the plurality of data lanes;
   determine which of the plurality of data lanes are not synchronized with respect to the other data lanes; and
   cause the per-lane BL shift logic to shift an incoming count pattern at data lanes receiving a count value different from the earliest count value by adding one or more burst lengths (BLs) until each data lane receives the same count value.

16. A method of operating a receiver device, the method comprising:

receiving, from a transmitter device over each a plurality of data lanes, an incoming data stream having a same pattern repeated at a number of clock cycles;

for each of the plurality of data lanes, shifting, using first shift logic, the incoming data stream one unit interval (UI) at a time until a shifted data pattern matches an expected data pattern on the respective data lane;

receiving, from the transmitter device over each of the plurality of data lanes, a count value at every clock cycle; and shifting, using second shift logic, one or more burst lengths (BLs) until each data lane receives a same count value, representing the plurality of data lanes being synchronized with respect to a same frame boundary.

17. The method of claim 16, wherein receiving the incoming data stream comprises receiving the incoming data stream asynchronously from the transmitter device.

18. The method of claim 16, further comprising:
storing the expected data pattern at the receiver device;
initiating frame recovery training of the plurality of data lanes;
determining whether a pattern received at each data lane is synchronized with respect to a frame boundary by comparing incoming bits of the incoming data stream with the expected data pattern, wherein the expected data pattern is a non-aliasing pattern; and
responsive to a determination that the incoming bits at the respective data lane do not correspond to the frame boundary, shifting the incoming bits by one or more UIs until the incoming bits do correspond to the frame boundary, the incoming bits correspond to the frame boundary when the shifted data pattern matches the expected data pattern on the respective data lane.

19. The method of claim 18, further comprising, after each data of the plurality of data lanes is synchronized with respect to the frame boundary, aligning each data lane to the same frame boundary by comparing the count value received at the respective lane with an earliest count value received at one of the plurality of data lanes and shifting the one or more BLs until the count value received at the respective data lane matches the earliest count value.

20. The method of claim 18, further comprising, after each data of the plurality of data lanes is synchronized with respect to the frame boundary:
determining an earliest count value received across the plurality of data lanes;
determining which of the plurality of data lanes are not synchronized with respect to the other data lanes; and
shifting an incoming count pattern at data lanes receiving a count value different from the earliest count value by adding one or more burst lengths (BLs) until each data lane receives the same count value.

\* \* \* \* \*